United States Patent
Takahashi et al.

(10) Patent No.: US 11,812,516 B2
(45) Date of Patent: Nov. 7, 2023

(54) USER APPARATUS AND BASE STATION APPARATUS FOR INDICATING A BAND COMBINATION THAT CAN BE APPLIED TO DUAL CONNECTIVITY

(71) Applicant: NTT DOCOMO, INC., Tokyo (JP)

(72) Inventors: Hideaki Takahashi, Tokyo (JP); Wuri Andarmawanti Hapsari, Tokyo (JP)

(73) Assignee: NTT DOCOMO, INC, Tokyo (JP)

( * ) Notice: Subject to any disclaimer, the term of this patent is extended or adjusted under 35 U.S.C. 154(b) by 0 days.

(21) Appl. No.: 16/962,045

(22) PCT Filed: Jan. 21, 2019

(86) PCT No.: PCT/JP2019/001640
§ 371 (c)(1),
(2) Date: Jul. 14, 2020

(87) PCT Pub. No.: WO2019/146542
PCT Pub. Date: Aug. 1, 2019

(65) Prior Publication Data
US 2020/0367318 A1    Nov. 19, 2020

(30) Foreign Application Priority Data
Jan. 25, 2018    (JP) .................. 2018-010625

(51) Int. Cl.
*H04W 88/06*    (2009.01)
*H04W 8/24*    (2009.01)
(Continued)

(52) U.S. Cl.
CPC ............ *H04W 88/06* (2013.01); *H04W 8/24* (2013.01); *H04W 28/18* (2013.01); *H04W 72/51* (2023.01)

(58) Field of Classification Search
CPC ..... H04W 48/16; H04W 88/10; H04W 72/14; H04W 72/0453; H04W 8/22;
(Continued)

(56) References Cited

U.S. PATENT DOCUMENTS 7,359,326 B1 * 4/2008 Harper .................. H04L 47/193
370/395.42
7,605,745 B2 * 10/2009 Honda .................. G01S 13/345
342/159

(Continued)

FOREIGN PATENT DOCUMENTS

CN          104426789 B  *  8/2017  ........... H04L 12/462
WO    WO-2014204735 A1 * 12/2014  ............ H04W 24/06
(Continued)

OTHER PUBLICATIONS

M. H. C. Garcia et al., "A Tutorial on 5G NR V2X Communications," in IEEE Communications Surveys & Tutorials, vol. 23, No. 3, pp. 1972-2026, thirdquarter Feb. 2021, doi: 10.1109/COMST.2021.3057017. (Year: 2021).*

(Continued)

*Primary Examiner* — William D Cumming
(74) *Attorney, Agent, or Firm* — Osha Bergman Watanabe & Burton LLP

(57) ABSTRACT

A user apparatus that performs communications with a base station apparatus by using a first RAT and a second RAT is provided. The user apparatus includes: a reception unit configured to receive, from the base station apparatus, first information indicating bands used for candidates of band combinations supported by the user apparatus; a generation unit configured to, based on the first information, generate terminal capability information including second information that includes a list including, at the beginning of the list, a band combination including a band used in the first RAT and a band used in the second RAT; and a transmission unit (Continued)

configured to transmit the generated terminal capability information to the base station apparatus.

6 Claims, 11 Drawing Sheets

(51) Int. Cl.
*H04W 28/18* (2009.01)
*H04W 72/51* (2023.01)

(58) Field of Classification Search
CPC . H04W 28/18; H04W 76/15; H04W 72/0413; H04W 72/048; H04W 8/005; H04W 8/24; H04W 72/1215; H04W 72/1289; H04W 36/14
USPC .................................... 370/329, 395.42, 252
See application file for complete search history.

(56) References Cited

U.S. PATENT DOCUMENTS

| | | | | |
|---|---|---|---|---|
| 8,990,534 | B2* | 3/2015 | Desai | G09G 5/001 711/158 |
| 9,445,276 | B2* | 9/2016 | Krishnamoorthy | H04W 72/0453 |
| 9,471,378 | B2* | 10/2016 | Desai | G06F 9/5038 |
| 10,104,589 | B2* | 10/2018 | Shirahatti | H04W 36/30 |
| 10,485,048 | B2* | 11/2019 | Zeng | H04W 72/1215 |
| 10,993,104 | B2* | 4/2021 | Kim | H04W 8/005 |
| 11,006,269 | B2* | 5/2021 | Baghel | H04W 72/23 |
| 11,057,883 | B2* | 7/2021 | Shimezawa | H04L 5/0042 |
| 11,096,044 | B2* | 8/2021 | Jin | H04W 8/24 |
| 2002/0039433 | A1* | 4/2002 | Shin | G06V 40/18 382/117 |
| 2005/0101329 | A1* | 5/2005 | Gallagher | H04W 76/12 455/445 |
| 2008/0106458 | A1* | 5/2008 | Honda | G01S 7/023 342/59 |
| 2013/0326166 | A1* | 12/2013 | Desai | G06F 9/5038 711/158 |
| 2014/0376393 | A1* | 12/2014 | Shi | H04W 36/14 370/252 |
| 2015/0055572 | A1* | 2/2015 | Ishikura | H04W 72/048 370/329 |
| 2015/0286500 | A1* | 10/2015 | Desai | G06F 9/5016 718/103 |
| 2015/0334574 | A1* | 11/2015 | Krishnamoorthy | H04W 72/0453 370/329 |
| 2016/0337946 | A1* | 11/2016 | Kim | H04W 48/16 |
| 2016/0374103 | A1 | 12/2016 | Sanka et al. | |
| 2017/0289886 | A1* | 10/2017 | Shirahatti | H04W 48/16 |
| 2018/0368199 | A1* | 12/2018 | Zeng | H04W 72/21 |
| 2020/0029202 | A1* | 1/2020 | Baghel | H04W 72/23 |
| 2020/0260265 | A1* | 8/2020 | Jin | H04W 8/24 |
| 2020/0305151 | A1* | 9/2020 | Shimezawa | H04L 27/2666 |
| 2020/0351638 | A1* | 11/2020 | Kim | H04W 8/24 |
| 2020/0351643 | A1* | 11/2020 | Dhanapal | H04W 72/56 |
| 2020/0367318 | A1* | 11/2020 | Takahashi | H04W 8/24 |
| 2021/0235465 | A1* | 7/2021 | Meylan | H04W 8/24 |
| 2021/0250753 | A1* | 8/2021 | Hosseini | H04L 5/0053 |
| 2021/0250754 | A1* | 8/2021 | Kim | H04W 8/24 |
| 2021/0250756 | A1* | 8/2021 | Baghel | H04W 76/16 |
| 2021/0258886 | A1* | 8/2021 | Sun | H04W 52/247 |
| 2021/0282127 | A1* | 9/2021 | Chaudhary | H04L 65/1059 |
| 2021/0298017 | A1* | 9/2021 | Shimezawa | H04W 72/04 |
| 2021/0321476 | A1* | 10/2021 | Zhang | H04W 52/365 |
| 2021/0337378 | A1* | 10/2021 | Hosseini | H04L 1/0038 |
| 2023/0098894 | A1* | 3/2023 | Sheikh | H04W 72/0453 370/329 |

FOREIGN PATENT DOCUMENTS

WO WO-2019031135 A1 * 2/2019 ............ H04W 24/10
WO WO-2020235318 A1 * 11/2020

OTHER PUBLICATIONS

I. Selinis, K. Katsaros, M. Allayioti, S. Vahid and R. Tafazolli, "The Race to 5G Era; LTE and Wi-Fi," in IEEE Access, vol. 6, pp. 56598-56636, Oct. 2018, doi: 10.1109/ACCESS.2018.2867729. (Year: 2018).*
I. Selinis, K. Katsaros, M. Allayioti, S. Vahid and R. Tafazolli, "The Race to 5G Era; LTE and Wi-Fi," in IEEE Access, vol. 6, pp. 56598-56636, 2018, doi: 10.1109/ACCESS.2018.2867729. (Year: 2018).*
C. Sexton, N. J. Kaminski, J. M. Marquez-Barja, N. Marchetti and L. A. DaSilva, "5G: Adaptable Networks Enabled by Versatile Radio Access Technologies," in IEEE Communications Surveys & Tutorials, vol. 19, No. 2, pp. 688-720, Secondquarter 2017, doi: 10.1109/COMST.2017.2652495. (Year: 2017).*
"Simulation and Synthesis Techniques for Asynchronous FIFO Design with Asynchronous Pointer Comparisons" by Cummings, et al., Apr. 9, 2002. (Year: 2002).*
International Search Report issued in PCT/JP2019/001640 dated Mar. 12, 2019 (5 pages).
Written Opinion of the International Searching Authority issued in PCT/JP2019/001640 dated Mar. 12, 2019 (8 pages).
3GPP TS 36.331 V15.0.1; "3rd Generation Partnership Project; Technical Specification Group Radio Access Network; Evolved Universal Terrestrial Radio Access (E-UTRA); Radio Recource Control (RRC); Protocol specification (Release 15)" Jan. 2018 (11 pages).
Intel Corporation; "38.331 TP on UE capabilities"; 3GPP TSG-RAN WG2 Meeting #100, R2-1714270; Reno, USA; Nov. 27-Dec. 1, 2017 (12 pages).
Huawei, HiSilicon; "Capability design for LTE NR DC"; 3GPP TSG-RAN WG2 NR Ad Hoc, R2-1707425; Qingdao, China; Jun. 27-29, 2017 (3 pages).
Intel Corporation; "LTE part capability size reduction for EN-DC (I038, 040 in RIL36.331,1077 in RIL38.331)"; 3GPP TSG RAN WG2 Meeting Ad hoc1801, R2-1801533; Vancouver, Canada; Jan. 22-26, 2018 (10 pages).
NTT Docomo, Inc.; "UE capability coordination for LTE-NR Dual Connectivity"; 3GPP TSG-RAN WG2 #97bis, R2-1702680; Spokane, USA; Apr. 3-7, 2017 (7 pages).
3GPP TR 38.804 V14.0.0; "3rd Generation Partnership Project; Technical Specification Group Radio Access Network; Study on New Radio Access Technology; Radio Interface Protocol Aspects (Release 14)" Mar. 2017 (57 pages).
3GPP TS 37.340 V15.0.0; "3rd Generation Partnership Project; Technical Specification Group Radio Access Network; Evolved Universal Terrestrial Radio Access (E-UTRA) and NR; Multi-connectivity: Stage 2 (Release 15)" Dec. 2017 (51 pages).
Extended European Search Report issued in counterpart European Application No. 19743838.5 dated Oct. 20, 2021 (10 pages).
Nokia, Nokia Shanghai Bell; "UE capability enquiry/reporting in NR RRC [N.037, N.038, N.040, N.045, N.046, N.221, N222]; 3GPP TSG RAN WG2 NR Ad hoc 1801", R2-1800831; Vancouver, Canada, Jan. 22-26, 2018 (6 pages).
Office Action issued in the counterpart Chinese Patent Application No. 201980009194.2, dated Jan. 30, 2023 (26 pages).
Office Action issued in the counterpart Indonesian Patent Application No. P00202006022, dated May 4, 2023 (9 pages).
Office Action issued in the counterpart European Patent Application No. 19743838.5, dated Aug. 2, 2023 (6 ages).

* cited by examiner

5.6.1.4 Compilation of band combinations supported by the UE

The UE shall:
1> if includes *requestedFreqBandList*:
  2> compile a list of band combinations, candidate for inclusion in the *UECapabilityInformation* message, only consisting of bands included in *requestedFreqBandList*, and prioritized in the order of *requestedFreqBandList*, (i.e. first include remaining band combinations containing the first-listed band, then include remaining band combinations containing the second-listed band, and so on);
  2> for each band combination included in the candidate list:
    3> if it is regarded as a fallback band combination with the same capabilities of another band combination included in the list of candidates as specified in TS 38.306 [xx]:
      4> remove the band combination from the list of candidates;
  2> include all band combinations in the candidate list into *supportedBandCombination*;
1> else:
  2> include all band combinations supported by the UE into *supportedBandCombination*, excluding fallback band combinations with the same capabilities of another band combination included in the list of band combinations supported by the UE.

| *requestedFreqBandList* |
|---|
| NR band 1 |
| NR band 2 |
| NR band 3 |
| E-UTRA band 1 |
| E-UTRA band 19 |
| E-UTRA band 21 |

FIG.3

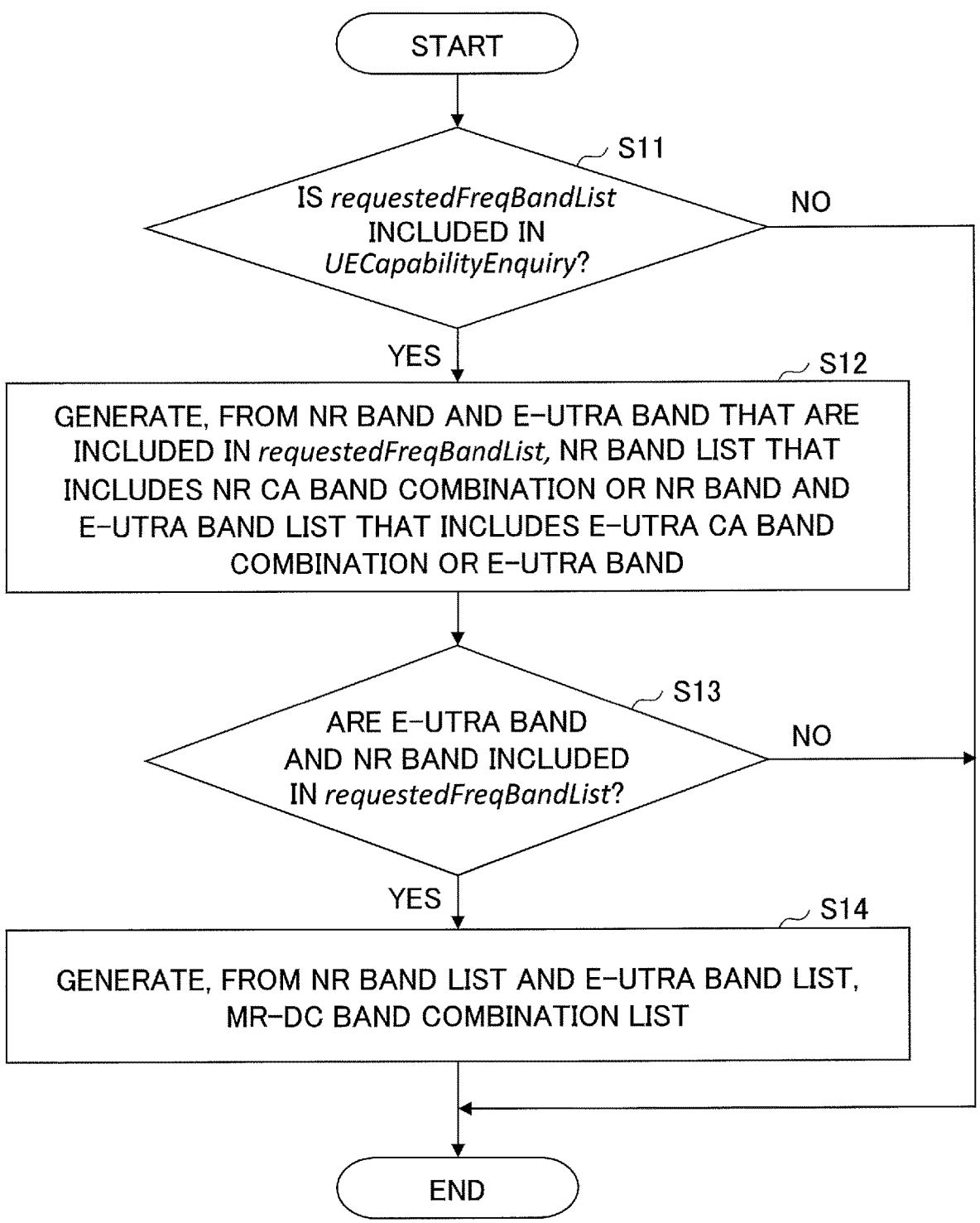

FIG.5

5.6.1.4 Compilation of band combinations supported by the UE

The UE shall:
1> if includes requestedFreqBandList:
    2> For NR band(s) listed in *requestedFreqBandList* (if exists), compile a list of NR CA band combinations, candidate for inclusion in the *UECapabilityInformation* message, only consisting of NR bands included in *requestedFreqBandList*, and prioritized in the order of *requestedFreqBandList*, (i.e. first include remaining NR CA band combinations containing the first-listed NR band, then include remaining NR CA band combinations containing the second-listed NR band, and so on);
    2> For E-UTRA band(s) listed in *requestedFreqBandList* (if exists), compile a list of E-UTRA CA band combinations, candidate for inclusion in the *UECapabilityInformation* message, only consisting of E-UTRA bands included in *requestedFreqBandList*, and prioritized in the order of *requestedFreqBandList*, (i.e. first include remaining E-UTRA CA band combinations containing the first-listed E-UTRA band, then include remaining E-UTRA CA band combinations containing the second-listed E-UTRA band, and so on);
    2> if both E-UTRA and NR bands are listed in *requestedFreqBandList*:
        3> compile a list of MR-DC band combinations, candidate for inclusion in the *UECapabilityInformation*, only consisting of E-UTRA and NR bands included in *requestedFreqBandList*, and prioritized from the list of NR CA band combinations and E-UTRA CA band combinations as described below;
        - at first, include remaining MR-DC band combinations containing the first listed NR CA band combination;
        - then, include remaining MR-DC band combinations containing the second listed NR CA band combination, and so on.
    2> for each band combination included in the candidate list:
        3> if it is regarded as a fallback band combination with the same capabilities of another band combination included in the list of candidates as specified in TS 38.306 [xx]:
            4> remove the band combination from the list of candidates;
    2> include all band combinations supported by the UE into *supportedBandCombination*;
1> else:
    2> include all band combinations supported by the UE into *supportedBandCombination*, excluding fallback band combinations with the same capabilities of another band combination included in the list of band combinations supported by the UE.

FIG.6

5.6.1.4 Compilation of band combinations supported by the UE

The UE shall:
1> if includes requestedFreqBandList:
  2> For NR band(s) listed in *requestedFreqBandList* (if exists), compile a list of NR CA band combinations, candidate for inclusion in the *UECapabilityInformation* message, only consisting of NR bands included in *requestedFreqBandList*, and prioritized in the order of *requestedFreqBandList*, (i.e. first include remaining NR CA band combinations containing the first-listed NR band, then include remaining NR CA band combinations containing the second-listed NR band, and so on);
  2> For E-UTRA band(s) listed in *requestedFreqBandList* (if exists), compile a list of E-UTRA CA band combinations, candidate for inclusion in the *UECapabilityInformation* message, only consisting of E-UTRA bands included in *requestedFreqBandList*, and prioritized in the order of *requestedFreqBandList*, (i.e. first include remaining E-UTRA CA band combinations containing the first-listed E-UTRA band, then include remaining E-UTRA CA band combinations containing the second-listed E-UTRA band, and so on);
  2> if both E-UTRA and NR bands are listed in *requestedFreqBandList*:
    3> compile a list of MR-DC band combinations, candidate for inclusion in the *UECapabilityInformation*, only consisting of E-UTRA and NR bands included in *requestedFreqBandList*, and prioritized from the list of NR CA band combinations and E-UTRA CA band combinations as described below;
    - at first, include remaining MR-DC band combinations containing the first listed E-UTRA CA band combination;
    - then, include remaining MR-DC band combinations containing the second listed E-UTRA CA band combination, and so on.
  2> for each band combination included in the candidate list:
    3> if it is regarded as a fallback band combination with the same capabilities of another band combination included in the list of candidates as specified in TS 38.306 [xx]:
      4> remove the band combination from the list of candidates;
  2> include all band combinations in the candidate list into *supportedBandCombination*;
1> else:
  2> include all band combinations supported by the UE into *supportedBandCombination*, excluding fallback band combinations with the same capabilities of another band combination included in the list of band combinations supported by the UE.

5.6.1.4 Compilation of band combinations supported by the UE

The UE shall:
1> if includes requestedFreqBandList:
  2> For NR band(s) listed in *requestedFreqBandList* (if exists), compile a list of NR CA band combinations, candidate for inclusion in the *UECapabilityInformation* message, only consisting of NR bands included in *requestedFreqBandList*, and prioritized in the order of *requestedFreqBandList*, (i.e. first include remaining NR CA band combinations containing the first-listed NR band, then include remaining NR CA band combinations containing the second-listed NR band, and so on);
  2> For E-UTRA band(s) listed in *requestedFreqBandList* (if exists), compile a list of E-UTRA CA band combinations, candidate for inclusion in the *UECapabilityInformation* message, only consisting of E-UTRA bands included in *requestedFreqBandList*, and prioritized in the order of *requestedFreqBandList*, (i.e. first include remaining E-UTRA CA band combinations containing the first-listed E-UTRA band, then include remaining E-UTRA CA band combinations containing the second-listed E-UTRA band, and so on);
  2> if both E-UTRA and NR bands are listed in *requestedFreqBandList*:
    3> compile a list of MR-DC band combinations, candidate for inclusion in the *UECapabilityInformation*, only consisting of E-UTRA and NR bands included in *requestedFreqBandList*, and prioritized from the list of NR CA band combinations and E-UTRA CA band combinations as described below;
    - at first, include remaining MR-DC band combinations containing the first listed E-UTRA CA band combination;
    - include remaining MR-DC band combinations containing the first listed NR CA band combination;
    - include remaining MR-DC band combinations containing the second listed E-UTRA CA band combination;
    - include remaining MR-DC band combinations containing the second listed NR CA band combination, and so on.
  2> for each band combination included in the candidate list:
    3> if it is regarded as a fallback band combination with the same capabilities of another band combination included in the list of candidates as specified in TS 38.306 [xx]:
      4> remove the band combination from the list of candidates;
  2> include all band combinations in the candidate list into *supportedBandCombination*;
1> else:
  2> include all band combinations supported by the UE into *supportedBandCombination*, excluding fallback band combinations with the same capabilities of another band combination included in the list of band combinations supported by the UE.

5.6.1.4 Compilation of band combinations supported by the UE

The UE shall:
1> if includes requestedFreqBandList:
  2> For NR band(s) listed in *requestedFreqBandList* (if exists), compile a list of NR CA band combinations, candidate for inclusion in the *UECapabilityInformation* message, only consisting of NR bands included in *requestedFreqBandList*, and prioritized in the order of *requestedFreqBandList*, (i.e. first include remaining NR CA band combinations containing the first-listed NR band, then include remaining NR CA band combinations containing the second-listed NR band, and so on);
  2> For E-UTRA band(s) listed in *requestedFreqBandList* (if exists), compile a list of E-UTRA CA band combinations, candidate for inclusion in the *UECapabilityInformation* message, only consisting of E-UTRA bands included in *requestedFreqBandList*, and prioritized in the order of *requestedFreqBandList*, (i.e. first include remaining E-UTRA CA band combinations containing the first-listed E-UTRA band, then include remaining E-UTRA CA band combinations containing the second-listed E-UTRA band, and so on);
  2> if both E-UTRA and NR bands are listed in *requestedFreqBandList*:
    3> compile a list of MR-DC band combinations, candidate for inclusion in the *UECapabilityInformation*, only consisting of E-UTRA and NR bands included in *requestedFreqBandList*, and prioritized from the list of NR CA band combinations and E-UTRA CA band combinations as described below;
    - at first, include remaining MR-DC band combinations containing the first listed NR CA band combination;
    - include remaining MR-DC band combinations containing the first listed E-UTRA CA band combination;
    - include remaining MR-DC band combinations containing the second listed NR CA band combination;
    - include remaining MR-DC band combinations containing the second listed E-UTRA CA band combination, and so on.
  2> for each band combination included in the candidate list:
    3> if it is regarded as a fallback band combination with the same capabilities of another band combination included in the list of candidates as specified in TS 38.306 [xx]:
      4> remove the band combination from the list of candidates;
  2> include all band combinations in the candidate list into *supportedBandCombination*;
1> else:
  2> include all band combinations supported by the UE into *supportedBandCombination*, excluding fallback band combinations with the same capabilities of another band combination included in the list of band combinations supported by the UE.

FIG.9

5.6.1.4 Compilation of band combinations supported by the UE

The UE shall:
1> if includes requestedFreqBandList:
    2> compile a list of band combinations, candidate for inclusion in the *UECapabilityInformation* message, only consisting of bands included in *requestedFreqBandList*, and prioritized in the order of *requestedFreqBandList*, (i.e. first include remaining band combinations containing the first-listed band, then include remaining band combinations containing the second-listed band, and so on);
    2> for each band combination included in the candidate list:
        3> if it is regarded as a fallback band combination with the same capabilities of another band combination included in the list of candidates as specified in TS 38.306 [xx]:
            4> remove the band combination from the list of candidates;
    2> include all band combinations in the candidate list into *supportedBandCombination*;
1> else:
    2> include all band combinations supported by the UE into *supportedBandCombination*, excluding fallback band combinations with the same capabilities of another band combination included in the list of band combinations supported by the UE.

Note: One E-UTRA band and one NR band shall be included in the first-listed band and the second-listed band in *requestedFreqBandList*.

USER APPARATUS AND BASE STATION APPARATUS FOR INDICATING A BAND COMBINATION THAT CAN BE APPLIED TO DUAL CONNECTIVITY

BACKGROUND OF THE INVENTION

1. Field of the Invention

The present invention relates to a user apparatus and a base station apparatus in a wireless communication system.

2. Description of the Related Art

Currently, in 3GPP (Third Generation Partnership Project), specifications have been developed for a new wireless communication system that is called "NR (New Radio Access Technology) system" as a successor of "LTE (Long Term Evolution) system" and "LTE-Advanced system" (e.g., non-patent document 1).

In the NR system, introduction of a technology called "LTE-NR Dual Connectivity" or "Multi-RAT (Multi Radio Access Technology) Dual Connectivity" (hereinafter, referred to as "MR-DC") has been discussed, in which, similar to the Dual Connectivity in the LTE system, data sets are divided between a base station of an LTE system (eNB) and a base station of an NR system (gNB) and the divided data sets are transmitted to or received by the base stations at the same time (e.g., non-patent document 2).

CITATION LIST

Non-Patent Document

[Non-Patent Document 1] 3GPP TR38.804 V14.0.0 (2017-03)
[Non-Patent Document 2] 3GPP TS37.340 V15.0.0 (2017-12)

SUMMARY OF THE INVENTION

Technical Problem

In MR-DC, a list, which includes bands specified in E-UTRA (Evolved Universal Terrestrial Radio Access) and bands specified in NR, is transmitted to a user apparatus. The user apparatus indicates band combinations supported by the user apparatus (selected) from the list to the base station apparatus. Here, a band combination to be applied to MR-DC is not necessarily generated from the list that includes bands specified in E-UTRA and bands specified in NR.

In view of the above-described problem, an object of the present invention is to provide a technique for indicating a band combination that can be applied to dual connectivity (DC) performed in a wireless communication system using a plurality of RATs.

Solution to Problem

According to an embodiment of the present invention, a user apparatus that performs communications with a base station apparatus by using a first RAT and a second RAT is provided. The user apparatus includes: a reception unit configured to receive, from the base station apparatus, first information indicating bands used for candidates of band combinations supported by the user apparatus; a generation unit configured to, based on the first information, generate terminal capability information including second information that includes a list including, at the beginning of the list, a band combination including a band used in the first RAT and a band used in the second RAT; and a transmission unit configured to transmit the generated terminal capability information to the base station apparatus.

Advantageous Effects of Invention

According to an embodiment of the present invention, it is possible to indicate a band combination that can be applied to dual connectivity (DC) performed in a wireless communication system using a plurality of RATs.

BRIEF DESCRIPTION OF THE DRAWINGS

FIG. 3 is a drawing illustrating an example of generating a band combination in MR-DC.

FIG. 4 is a flowchart illustrating a procedure of generating a band combination in MR-DC according to an embodiment of the present invention.

FIG. 5 is a drawing illustrating an example (1) of generating a band combination in MR-DC according to an embodiment of the present invention.

FIG. 6 is a drawing illustrating an example (2) of generating a band combination in MR-DC according to an embodiment of the present invention.

FIG. 7 is a drawing illustrating an example (3) of generating a band combination in MR-DC according to an embodiment of the present invention.

FIG. 8 is a drawing illustrating an example (4) of generating a band combination in MR-DC according to an embodiment of the present invention.

FIG. 9 is a drawing illustrating an example (5) of generating a band combination in MR-DC according to an embodiment of the present invention.

DETAILED DESCRIPTION OF THE PREFERRED EMBODIMENTS

Figure 1:
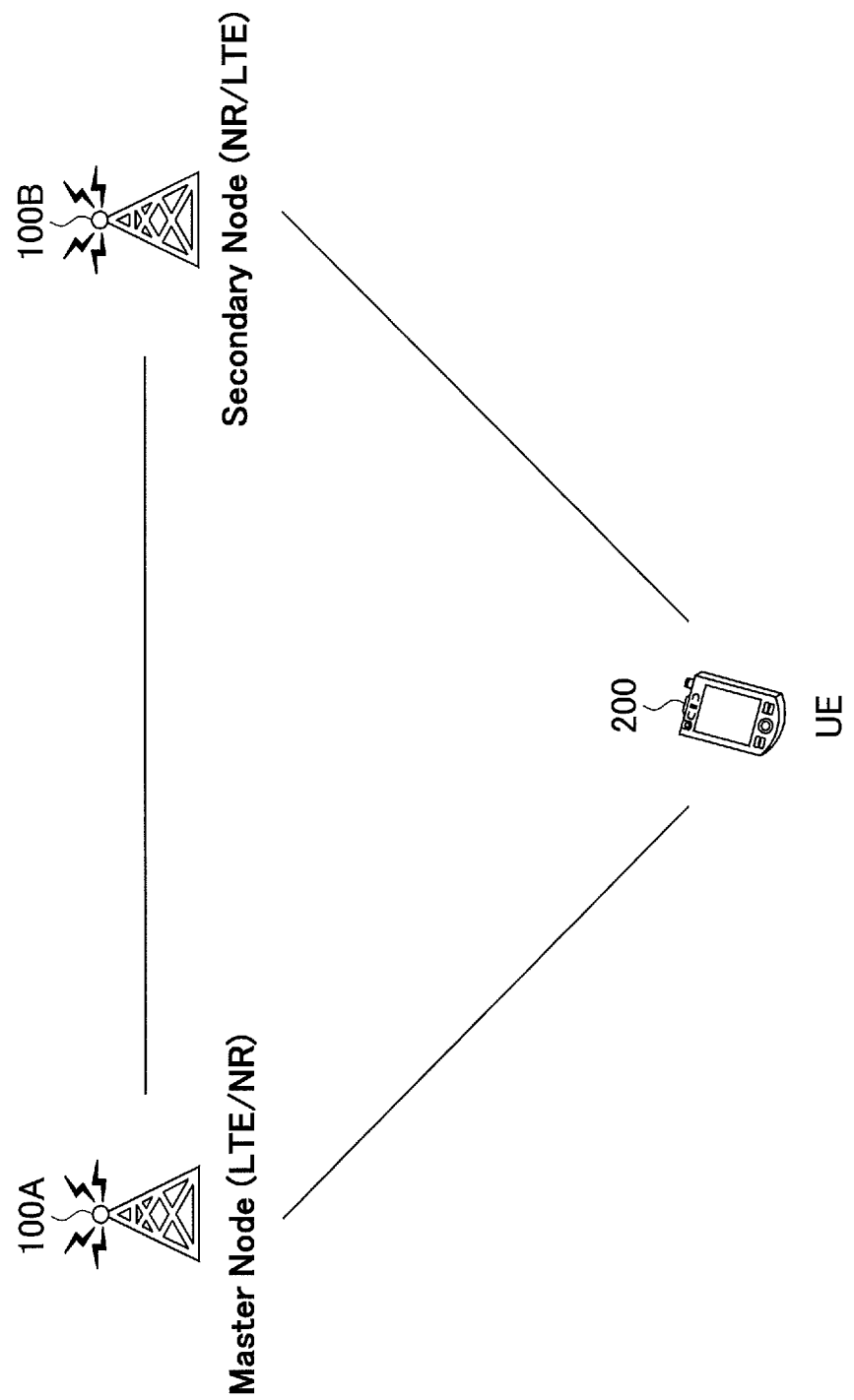
FIG. 1 is a configuration example of a wireless communication system according to an embodiment of the present invention.

In the following, referring to the drawings, one or more embodiments of the present invention will be described.

FIG. 1 is a configuration example of a wireless communication system according to an embodiment of the present invention. FIG. 1 is a schematic diagram illustrating a wireless communication system according to an embodiment of the present invention.

As illustrated in FIG. 1, a user apparatus 200 is communicably connected to a base station apparatus 100A and a base station apparatus 100B respectively provided by an LTE system and an NR system (hereinafter, referred to as "base station apparatuses 100" when the base station apparatus 100A and the base station apparatus 100B are not distinguished), and supports MR-DC that is LTE-NR dual connectivity in which the base station apparatus 100A is a master base station and the base station apparatus 100B is a secondary base station. In other words, it is possible for the user apparatus 200 to perform simultaneous transmission to or simultaneous reception from the master base station apparatus 100A and the secondary base station apparatus 100B by simultaneously using a plurality of component carriers provided by the master base station apparatus 100A and the secondary base station apparatus 100B. It should be noted that, although a single base station is included in each of the LTE system and the NR system in an embodiment illustrated in the figure, in general, many base stations are arranged in order to cover service areas of the LTE system and the NR system.

It should be noted that, although the LTE-NR dual connectivity will be described in the following embodiments, it should be easily understood by a person skilled in the art that a user apparatus according to an embodiment of the present invention is not limited to the above, and may be applied to dual connectivity between a plurality of wireless communication systems using different RATs, that is, MR-DC.

Figure 2:
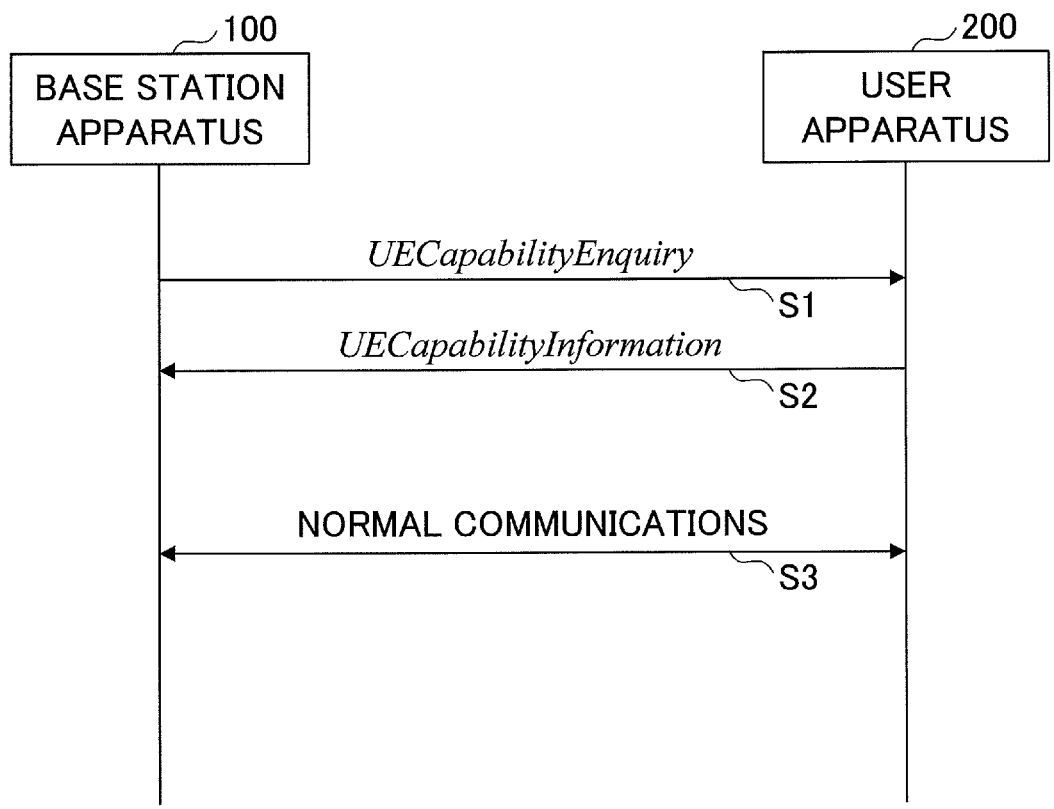
FIG. 2 is a sequence diagram in which a user apparatus 200 according to an embodiment of the present invention transmits capability information to a base station apparatus 100.

FIG. 2 is a sequence diagram in which a user apparatus 200 according to an embodiment of the present invention transmits terminal capability information to a base station apparatus 100. In FIG. 2, the base station apparatus 100 transmits a terminal capability transmission request to the user apparatus 200, and the user apparatus 200 transmits terminal capability information to the base station apparatus 100 in response to the terminal capability transmission request.

In step S1, the base station apparatus 100 transmits, as a terminal capability transmission request, an RRC (Radio Resource Control) message "UECapabilityEnquiry" to the user apparatus 200. "UECapabilityEnquiry" is used by a network in order to obtain information related to radio access capability of the user apparatus 200. It is possible for the base station apparatus 100 to specify a type of radio access capability included in the information transmitted by the user apparatus 200 by using "UECapabilityEnquiry". For example, the base station apparatus 100 may request for transmission of radio access capability related to a band combination supported by the user apparatus 200. Further, the base station apparatus 100 may request for transmission of a band combination, including bands included in a list, "requestedFreqBandList", transmitted to the user apparatus 200, supported by the user apparatus 200.

Next, in step S2, the user apparatus 200 transmits, as the terminal capability information, an RRC message, "UECapabilityInformation", to the base station apparatus 100. "UECapabilityInformation" is used for transmitting information related to radio access capability of the user apparatus 200 to the network. The user apparatus 200 transmits the information related to radio access capability supported by the user apparatus 200 to the base station apparatus 100 based on the "UECapabilityEnquiry" received from the base station apparatus 100 in step S1.

In step S3, the base station apparatus 100 performs normal communications adapted to the terminal capability according to the "UECapabilityInformation" received from the user apparatus 200 in step S2. For example, in the case where information indicating the supported band combinations is included in the "UECapabilityInformation" received from the user apparatus 200 in step S2, the base station apparatus 100 performs the scheduling within a range of the supported band combinations.

FIG. 3 is a drawing illustrating an example of generating a band combination in MR-DC. As illustrated in FIG. 3, the user apparatus 200 generates a list, "supportedBandCombination", of supported band combinations based on bands included in a list, "requestedFreqBandList", and the order of bands in the list.

For example, the user apparatus 200 has, as a candidate, a band combination of a first band and a second band in "requestedFreqBandList". Next, the user apparatus 200 has, as a candidate, a band combination of a first band and a third band. Next, the user apparatus 200 has, as a candidate, a band combination of a first band and a fourth band. Next, the user apparatus 200 has, as a candidate, a band combination of a first band and a fifth band. Next, the user apparatus 200 has, as a candidate, a band combination of a first band and a sixth band. Next, the user apparatus 200 has, as a candidate, a band combination of a second band and a third band. Next, the user apparatus 200 has, as a candidate, a band combination of a second band and a fourth band. The user apparatus 200 generates "supportedBandCombination" in the order described above.

Here, in a case of "requestedFreqBandList" illustrated in FIG. 3, the first through the third bands are NR bands, and thus, the beginning of the "supportedBandCombination" includes band combinations including NR bands alone. The band combinations including NR bands alone cannot be applied to MR-DC. Therefore, in an embodiment of the present invention, a band combination generation method will be proposed in which the beginning of "supportedBandCombination" includes a band combination that includes an E-UTRA band and an NR band.

FIG. 4 is a flowchart illustrating a procedure of generating a band combination in MR-DC according to an embodiment of the present invention.

In step S11, the user apparatus 200 determines whether "requestedFreqBandList" is included in "UECapabilityEnquiry" transmitted from the base station apparatus 100. In the case where "requestedFreqBandList" is included (YES in S11), the flow proceeds to step S12, and in the case where "requestedFreqBandList" is not included (NO in S11), the flow ends.

In step S12, the user apparatus 200 generates "NR band list", from NR bands included in "requestedFreqBandList", that includes NR CA band combinations or NR bands supported by the user apparatus 200. Further, the user apparatus 200 generates "E-UTRA band list", from E-UTRA bands included in "requestedFreqBandList", that includes E-UTRA CA band combinations or E-UTRA bands supported by the user apparatus 200. It should be noted that the order of bands listed in "NR band list" or "E-UTRA band list" maintains the order of bands listed in "requestedFreqBandList".

Next, the user apparatus 200 determines whether "requestedFreaBandList" includes both of an E-UTRA band and an NR band. In the case where "requestedFreqBandList" includes both of an E-UTRA band and an NR band (YES in S13), the flow proceeds to step S14, and in the case where "requestedFreqBandList" includes only one of an E-UTRA and an NR band (NO in S13), the flow ends.

In step S14, the user apparatus 200 generates "MR-DC band combination list" based on the "NR band list" and the "E-UTRA band list" generated in step S12, and the flow ends.

It should be noted that the user apparatus 200 may arrange the "MR-DC band combination list" generated by the procedure described above at the beginning of the "supportedBandCombination" and may arrange the "NR band list" or the "E-UTRA band list" towards the end of the "supportedBandCombination".

FIG. 5 is a drawing illustrating an example (1) of generating a band combination in MR-DC according to an embodiment of the present invention. Referring to FIG. 5, details of the order of bands will be described when "MR-DC band combination list" is generated from the "NR band list" and the "E-UTRA band list" in step S14 in FIG. 4.

As illustrated in FIG. 5, the user apparatus 200 has, as a candidate, the first NR CA band combination in the "NR band list" and the first E-UTRA CA band combination in the "E-UTRA band list". Next, the user apparatus 200 has, as a candidate, the first NR CA band combination in the "NR band list" and the second E-UTRA CA band combination in the "E-UTRA band list". In the order as described above, the user apparatus 200 repeatedly has, as candidates, the first NR CA band combination and bands in the "E-UTRA band list". After having, as candidates, the first NR CA band combination in the "NR band list" and the last E-UTRA CA band combination in the "E-UTRA band list", the user apparatus 200 has, as a candidate, the second NR CA band combination in the "NR band list" and the first E-UTRA CA band combination in the "E-UTRA band list". In this way, the user apparatus 200 repeats the operation until the user apparatus 200 has, as a candidate, the second NR CA band combination in the "NR band list" and the last E-UTRA CA band combination in the "E-UTRA band list".

As described above, the user apparatus 200 generates the "MR-DC band combination list", from the "NR band list" and the "E-UTRA band list", in the order of "NR band list" first. It should be noted that the above-described "NR CA band combination" or the "E-UTRA band combination" may include not only band combinations but also bands.

FIG. 6 is a drawing illustrating an example (2) of generating a band combination in MR-DC according to an embodiment of the present invention. Referring to FIG. 6, details of the order of bands will be described when "MR-DC band combination list" is generated from the "NR band list" and the "E-UTRA band list" in step S14 in FIG. 4.

As illustrated in FIG. 6, the user apparatus 200 has, as a candidate, the first E-UTRA CA band combination in the "E-UTRA band list" and the first NR CA band combination in the "NR band list". Next, the user apparatus 200 has, as a candidate, the first E-UTRA CA band combination in the "E-UTRA band list" and the second NR CA band combination in the "NR band list". In the order as described above, the user apparatus 200 repeatedly has, as candidates, the first E-UTRA CA band combination and bands in the "NR band list". After having, as candidates, the first E-UTRA CA band combination in the "E-UTRA band list" and the last NR CA band combination in the "NR band list", the user apparatus 200 has, as a candidate, the second E-UTRA CA band combination in the "E-UTRA band list" and the first NR CA band combination in the "NR band list". In this way, the user apparatus 200 repeats the operation until the user apparatus 200 has, as a candidate, the second E-UTRA CA band combination in the "E-UTRA band list" and the last NR CA band combination in the "NR band list".

As described above, the user apparatus 200 generates the "MR-DC band combination list", from the "NR band list" and the "E-UTRA band list", in the order of "E-UTRA band list" first. It should be noted that the above-described "NR CA band combination" or the "E-UTRA band combination" may include not only band combinations but also bands.

FIG. 7 is a drawing illustrating an example (3) of generating a band combination in MR-DC according to an embodiment of the present invention. Referring to FIG. 7, details of the order of bands will be described when "MR-DC band combination list" is generated from the "NR band list" and the "E-UTRA band list" in step S14 in FIG. 4.

As illustrated in FIG. 7, the user apparatus 200 has, as a candidate, the first E-UTRA CA band combination in the "E-UTRA band list" and the first NR CA band combination in the "NR band list". Next, the user apparatus 200 has, as a candidate, the first E-UTRA CA band combination in the "E-UTRA band list" and the second NR CA band combination in the "NR band list". In the order as described above, the user apparatus 200 repeatedly has, as candidates, the first E-UTRA CA band combination and bands in the "NR band list". After having, as a candidate, the first E-UTRA CA band combination in the "E-UTRA band list" and the last NR CA band combination in the "NR band list", the user apparatus 200 has, as a candidate, the first NR CA band combination in the "NR band list" and the second E-UTRA CA band combination in the "E-UTRA band list". The user apparatus 200 repeats the operation until the user apparatus 200 has, as a candidate, the first NR CA band combination in the "NR band list" and the last E-UTRA CA band combination in the "E-UTRA band list".

Next, the user apparatus 200 has, as a candidate, the second E-UTRA CA band combination in the "E-UTRA band list" and the second NR CA band combination in the "NR band list". The user apparatus 200 repeats the operation until the user apparatus 200 has, as a candidate, the second E-UTRA CA band combination in the "E-UTRA band list" and the last NR CA band combination in the "NR band list".

Next, the user apparatus 200 has, as a candidate, the second NR CA band combination in the "NR band list" and the third E-UTRA CA band combination in the "E-UTRA band list". The user apparatus 200 repeats the operation until the user apparatus 200 has, as a candidate, the second NR CA band combination in the "NR band list" and the last E-UTRA CA band combination in the "E-UTRA band list".

As described above, the user apparatus 200 generates the "MR-DC band combination list", from the "NR band list" and the "E-UTRA band list", by alternately selecting "E-UTRA band list" and "NR band list" in this order. It should be noted that the above-described "NR CA band combination" or the "E-UTRA band combination" may include not only band combinations but also bands.

FIG. 8 is a drawing illustrating an example (4) of generating a band combination in MR-DC according to an embodiment of the present invention. Referring to FIG. 8, details of the order of bands will be described when "MR-DC band combination list" is generated from the "NR band list" and the "E-UTRA band list" in step S14 in FIG. 4.

As illustrated in FIG. 8, the user apparatus 200 has, as a candidate, the first NR CA band combination in the "NR band list" and the first E-UTRA CA band combination in the "E-UTRA band list". Next, the user apparatus 200 has, as a candidate, the first NR CA band combination in the "NR band list" and the second E-UTRA CA band combination in the "E-UTRA band list". In the order as described above, the user apparatus 200 repeatedly has, as candidates, the first NR CA band combination and bands in the "E-UTRA band list". After having, as a candidate, the first NR CA band combination in the "NR band list" and the last E-UTRA CA band combination in the "E-UTRA band list", the user apparatus 200 has, as a candidate, the first E-UTRA CA band combination in the "E-UTRA band list" and the second NR CA band combination in the "NR band list". The user apparatus 200 repeats the operation until the user apparatus 200 has, as a candidate, the first E-UTRA CA band combination in the "E-UTRA band list" and the last NR CA band combination in the "NR band list".

Next, the user apparatus 200 has, as a candidate, the second NR CA band combination in the "NR band list" and the second E-UTRA CA band combination in the "E-UTRA band list". The user apparatus 200 repeats the operation until the user apparatus 200 has, as a candidate, the second NR CA band combination in the "NR band list" and the last E-UTRA CA band combination in the "E-UTRA band list".

Next, the user apparatus 200 has, as a candidate, the second E-UTRA CA band combination in the "E-UTRA band list" and the third NR CA band combination in the "NR band list". The user apparatus 200 repeats the operation until the user apparatus 200 has, as a candidate, the second E-UTRA CA band combination in the "E-UTRA band list" and the last NR CA band combination in the "NR band list".

As described above, the user apparatus 200 generates the "MR-DC band combination list", from the "NR band list" and the "E-UTRA band list", by alternately selecting "NR band list" and "E-UTRA band list" in this order. It should be noted that the above-described "NR CA band combination" or the "E-UTRA band combination" may include not only band combinations but also bands.

FIG. 9 is a drawing illustrating an example (5) of generating a band combination in MR-DC according to an embodiment of the present invention. As described in the "Note" in FIG. 9, there may be a case that one E-UTRA band and one NR band are necessarily included in the first two bands in "requestedFreqBandList". By using the above-described "requestedFreqBandList", even in the case where "supportedBandCombination" is generated according to the method illustrated in FIG. 3, it is possible for the user apparatus 200 to indicate, to the base station apparatus 100, "supportedBandCombination" in which an MR-DC band combination is necessarily included at the beginning.

As described in the above-described embodiments of the present invention, it is possible for the user apparatus 200 to generate "MR-DC band combination list" by extracting "NR band list" and "E-UTRA band list" from "requestedFreqBandList". It is possible for the user apparatus 200 to indicate, to the base station apparatus 100, "supportedBandCombination" in which an MR-DC band combination is included at the beginning by using "MR-DC band combination list". Further, by necessarily including an NR band and an E-UTRA band in the first two bands in "requestedFreqBandList", it is possible for the base station apparatus 100 to have "supportedBandCombination", in which an MR-DC band combination is included at the beginning, indicated by the user apparatus 200.

In other words, it is possible to indicate a band combination that can be applied to dual connectivity (DC) performed in a wireless communication system using a plurality of RATs.

(Apparatus Structure)

Next, examples of functional structures of the base station apparatus 100 and the user apparatus 200 that perform the processes and operations described above will be described. The base station apparatus 100 and the user apparatus 200 each have at least functions for performing an embodiment of the present invention. It should be noted that the base station apparatus 100 and the user apparatus 200 each may have only a part of the functions for performing an embodiment of the present invention.

Figure 10:
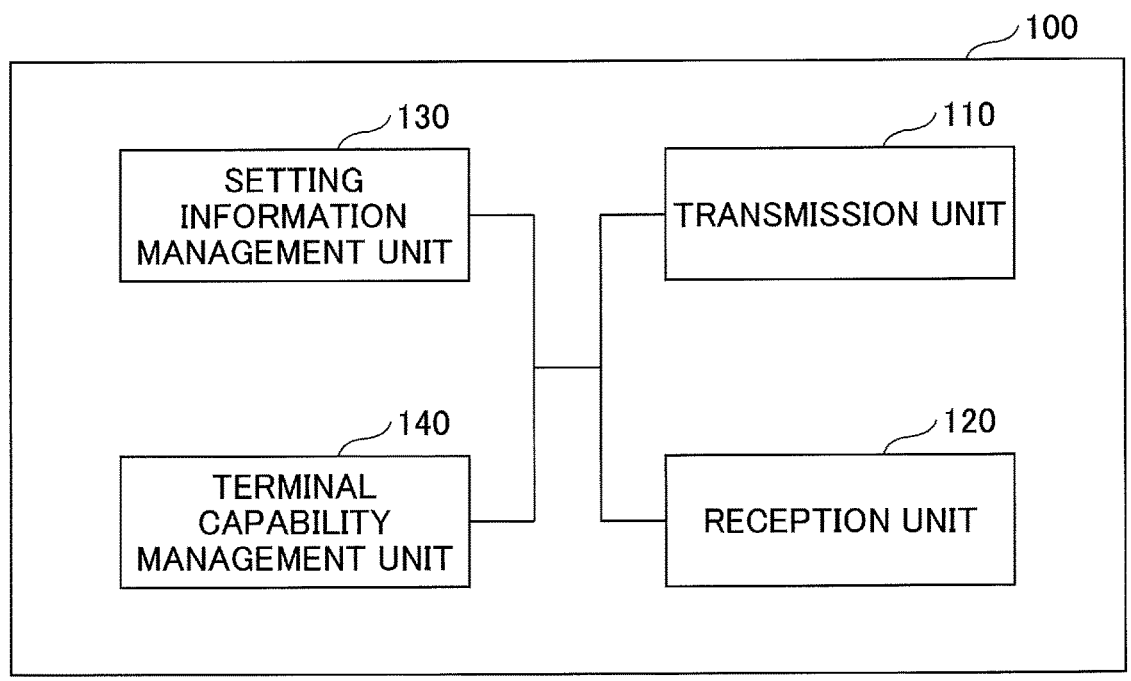
FIG. 10 is a drawing illustrating an example of a functional structure of a base station apparatus 100 according to an embodiment of the present invention.

FIG. 10 is a drawing illustrating an example of a functional structure of a base station apparatus 100. As illustrated in FIG. 10, the base station apparatus 100 includes a transmission unit 110, a reception unit 120, a setting information management unit 130, and a terminal capability management unit 140. The functional structure illustrated in FIG. 10 is merely an example. Functional divisions and names of functional units may be anything as long as it can perform operations according to an embodiment of the present invention.

The transmission unit 110 has a function for generating a signal to be transmitted to the user apparatus 200 and for transmitting the signal wirelessly. The reception unit 120 has a function for receiving various signals transmitted from the user apparatus 200 and for obtaining, for example, upper layer information from the received signals. Further, the transmission unit 110 has a function for transmitting, to the user apparatus 200, PSS or NR-SSS, SSS or NR-SSS, PBCH or NR-PBCH, DL/UL control signals, etc. Further, the transmission unit 110 transmits, to the user apparatus 200, a message for requesting the terminal capability indication and information indicating the UL or DL scheduling. The reception unit 120 receives a message related to the terminal capability indication from the user apparatus 200.

The setting information management unit 130 stores preset setting information and various setting information items to be transmitted to the user apparatus 200. Contents of the setting information are, for example, information related to the band combination, information related to the terminal capability, etc.

The terminal capability management unit 140 performs controlling transmission, from the base station apparatus 100 to the user apparatus 200, of a request message for the terminal capability indication such as a "UECapabilityEnquiry", and performs controlling communications corresponding to the terminal capability by receiving the terminal capability indication from the user apparatus 200.

Figure 11:
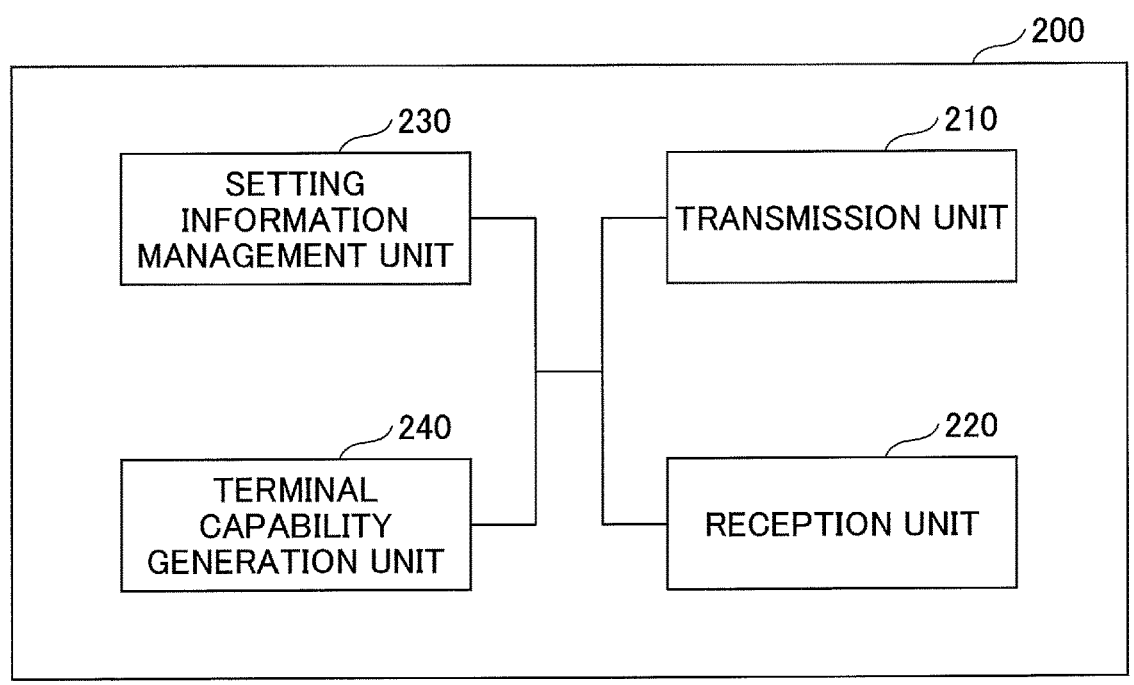
FIG. 11 is a drawing illustrating an example of a functional structure of a user apparatus 200 according to an embodiment of the present invention.

FIG. 11 is a drawing illustrating an example of a functional structure of a user apparatus 200. As illustrated in FIG. 11, the user apparatus 200 includes a transmission unit 210, a reception unit 220, a setting information management unit 230, and a terminal capability generation unit 240. The functional structure illustrated in FIG. 11 is merely an example. Functional divisions and names of functional units may be anything as long as it can perform operations according to an embodiment of the present invention.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving the PSS or NR-PSS, the SSS or NR-SSS, the PBCH or NR-PBCH, the DL/UL control signals, etc., transmitted from the base station apparatus 100. Further, the transmission unit 210 transmits, to the base station apparatus 100, a message related to the terminal capability indication. The reception unit 120 receives, from the base station apparatus 100, a message related to the terminal capability indication request and information indicating the UL or DL scheduling.

The setting information management unit 230 stores various setting information items received by the reception unit 220 from the base station apparatus 100. Further, the setting information management unit 230 also stores preset setting information. Contents of the setting information are, for example, information related to the band combination, information related to the terminal capability indication, etc.

The terminal capability generation unit 240 performs controlling generation and transmission of the terminal capability indication message (e.g., "UECapabilityInformation") to be transmitted from the user apparatus 200 to the base station apparatus 100. It should be noted that the function of the terminal capability generation unit 240 related to the transmission of the terminal capability indication message may be included in the transmission unit 210, and the function of the terminal capability generation unit 240 related to the reception of the terminal capability indication request message may be included in the reception unit 220.

(Hardware Structure)

In the above functional structure diagrams used for describing an embodiment of the present invention (FIG. 10 and FIG. 11), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless).

Figure 12:
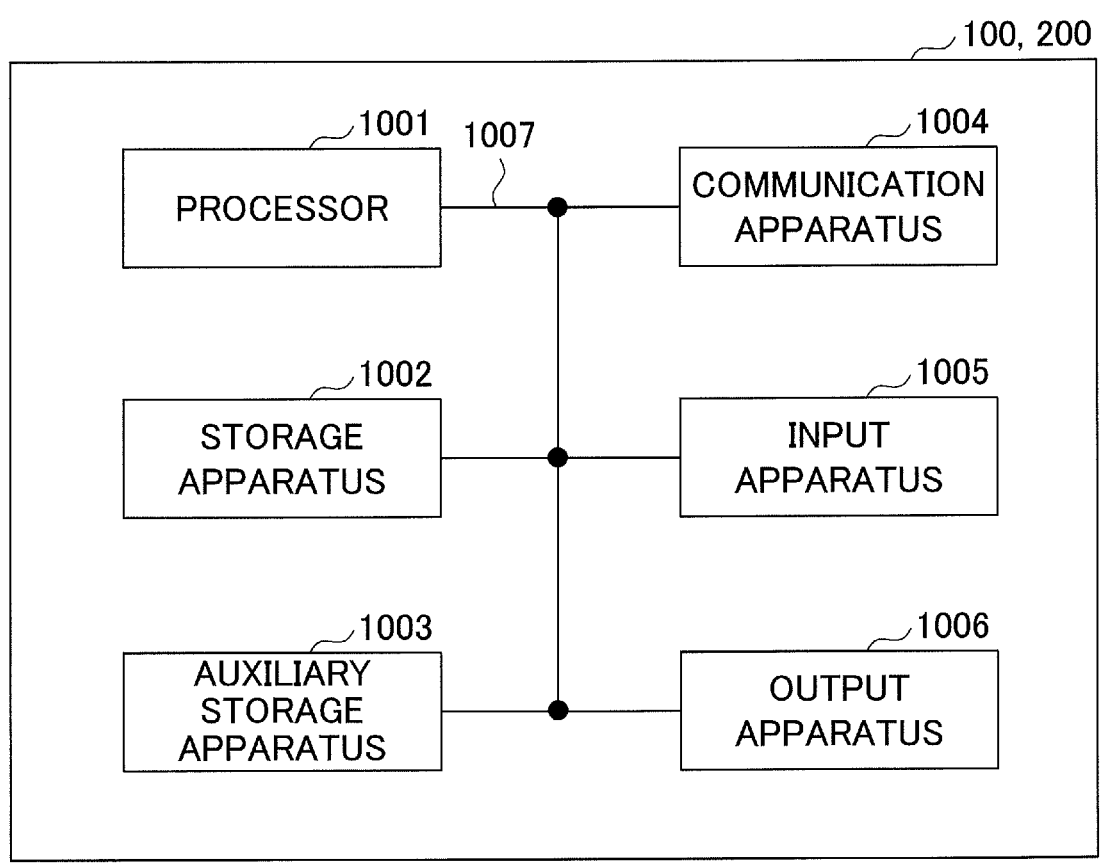
FIG. 12 is a drawing illustrating an example of a functional structure of a user apparatus 100 and a base station apparatus 200 according to an embodiment of the present invention.

Further, for example, a base station apparatus 100 and a user apparatus 200 according to an embodiment of the present invention may function as computers that perform processes according to an embodiment of the present invention. FIG. 12 is a drawing illustrating an example of a hardware structure of a wireless communication apparatus that is a base station apparatus 100 or a user apparatus 200 according to an embodiment of the present invention. Each of the base station apparatus 100 and the user apparatus 200 may be physically a computer apparatus including a processor 1001, a storage apparatus 1002, an auxiliary storage apparatus 1003, a communication apparatus 1004, an input apparatus 1005, an output apparatus 1006, a bus 1007, etc.

It should be noted that, in the descriptions below, the term "apparatus" can be read as a circuit, a device, a unit, etc. The hardware structures of the base station apparatus 100 and the user apparatus 200 may include one or more of each of the apparatuses indicated by 1001 to 1006 illustrated in the figure, or may not include some apparatuses.

Each of the functions of the base station apparatus 100 and the user apparatus 200 is realized by causing predetermined software (program) to be read by hardware such as the processor 1001, the storage apparatus 1002, or the like, by causing the processor 1001 to perform calculations, and by causing the processor 1001 to control communications by the communication apparatus 1004, and to control reading and/or writing data by the storage apparatus 1002 and the auxiliary storage apparatus 1003.

The processor 1001 controls the entire computer by, for example, controlling the operating system. The processor 1001 may include a central processing unit (CPU) including an interface with a peripheral apparatus, a control apparatus, a calculation apparatus, a register, etc.

Further, the processor 1001 reads a program (program code), a software module, or data from the auxiliary storage apparatus 1003 and/or the communication apparatus 1004, writes the program, the software module, or the data to the storage apparatus 1002, and performs various processes according to the program, the software module, or the data. As the program, a program is used that causes the computer to perform at least a part of operations according to an embodiment of the present invention described above. For example, the transmission unit 110, the reception unit 120, the setting information management unit 130, and the terminal capability management unit 140 of the base station apparatus 100 illustrated in FIG. 10 may be realized by control programs that are stored in the storage apparatus 1002 and are executed by the processor 1001. Further, for example, the transmission unit 210, the reception unit 220, the setting information management unit 230, and the terminal capability generation unit 240 of the user apparatus 200 illustrated in FIG. 11 may be realized by control programs that are stored in the storage apparatus 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage apparatus 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage apparatus 1002 may be referred to as a register, a cache, a main memory, etc. The storage apparatus 1002 is enabled to store programs (program codes), software modules, or the like, that are executable for performing processes according to an embodiment of the present invention.

The auxiliary storage apparatus 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The auxiliary storage apparatus 1003 may be referred to as an auxiliary storage apparatus. The above recording medium may be a database including the storage apparatus 1002 and/or the auxiliary storage apparatus 1003, a server, or any other appropriate medium.

The communication apparatus 1004 is hardware (transmission and reception device) for communicating with computers via a wired and/or wireless network, and may be referred to as a network device, a network controller, a network card, a communication module, etc. For example, the transmission unit 110 and the reception unit 120 of the base station apparatus 100 may be realized by the communication apparatus 1004. Further, the transmission unit 210 and the reception unit 220 of the user apparatus 200 may be realized by the communication apparatus 1004.

The input apparatus 1005 is an input device that receives an external input (e.g., keyboard, mouse, microphone, switch, button, sensor). The output apparatus 1006 is an output device that outputs something to the outside (e.g., display, speaker, LED lamp). It should be noted that the input apparatus 1005 and the output apparatus 1006 may be integrated into a single apparatus (e.g., touch panel).

Further, the apparatuses including the processor 1001, the storage apparatus 1002, etc., are connected to each other via the bus 1007 used for communicating information. The bus 1007 may include a single bus, or may include different buses between the apparatuses.

Further, each of the base station apparatus 100 and the user apparatus 200 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a user apparatus that performs communications with a base station apparatus by using a first RAT and a second RAT is provided. The user apparatus includes: a reception unit configured to receive, from the base station apparatus, first information indicating bands used for candidates of band combinations supported by the user apparatus; a generation unit configured to, based on the first information, generate terminal capability information including second information that includes a list including, at the beginning of the list, a band combination including a band used in the first RAT and a band used in the second RAT; and a transmission unit configured to transmit the generated terminal capability information to the base station apparatus.

According to the above, it is possible to indicate a band combination that can be applied to dual connectivity (DC) performed in a wireless communication system using a plurality of RATs.

Based on the first information, a first list including bands used in the first RAT and a second list including bands used in the second RAT may be generated, and, based on the first list and the second list, the second information may be generated. According to the above, it is possible for the user apparatus 200 to indicate a band combination that can be applied to dual connectivity (DC) performed in a wireless communication system using a plurality of RATs.

The second information may be generated by prioritizing the order of the bands in the first list. According to the above, it is possible to reflect the prioritized RAT bands according to the order of list of supported band combinations.

The second information may be generated by prioritizing the order of the bands in the second list. According to the above, it is possible to reflect the prioritized RAT bands according to the order of a list of supported band combinations.

The second information may be generated by alternately prioritizing the bands in the first list and the bands in the second list. According to the above, it is possible to alternately arrange the bands of a plurality of RATs according to the order of a list of supported band combinations.

Further, according to an embodiment of the present invention, a base station apparatus that performs communications with a user apparatus by using a first RAT and a second RAT is provided. The base station apparatus includes: a transmission unit configured to transmit first information indicating bands used for candidates of band combinations supported by the user apparatus; a reception unit configured to receive terminal capability information including second information that includes a list including, at the beginning of the list, a band combination including a band used in the first RAT and a band used in the second RAT based on the first information; and a management unit configured to control communications with the user apparatus based on the received terminal capability information.

According to the above, it is possible to indicate a band combination that can be applied to dual connectivity (DC) performed in a wireless communication system using a plurality of RATs.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, a user apparatus UE, or a base station eNB has been described by using functional block diagrams. However, the apparatuses may be realized by hardware, software, or a combination of hardware and software. The software executed by a processor included in a user apparatus UE according to an embodiment of the present invention and the software executed by a processor included in a base station eNB according to an embodiment of the present invention may be stored in a random access memory (RA), a flash memory, a read only memory (ROM), an EPROM, an EEPROM, a register, a hard disk (HDD), a removable disk, a CD-ROM, a database, a server, or any other appropriate recording medium.

Further, information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

Aspects and embodiments described in the present specification may be applied to a system in which LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems are used, or may be applied to a next generation system enhanced based on the above systems.

The order of processing steps, sequences or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station apparatus 100 in the present specification, may be performed by an upper node in some cases. In a network including one or more network nodes including a base station apparatus 100, it is apparent that various operations performed for communicating with a user apparatus 200 may be performed by the base station apparatus 100 and/or another network node other than the base station apparatus 100 (for example, but not limited to, MME or S-GW). According to the above, a case is described in which there is a single network node other than the base station apparatus 100. However, a combination of multiple other network nodes may be considered (e.g., MME and S-GW).

An aspect/embodiment described in the present specification may be used independently, may be used in combination, or may be used by switching according to operations.

There is a case in which the user apparatus 200 may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

There is a case in which the base station apparatus 100 may be referred to, by a person skilled in the art, as a NB (NodeB), an eNB (enhanced NodeB), a gNB, a base station, or some other appropriate terms.

As used herein, the term "determining" may encompasses a wide variety of actions. The "determining" may include, for example, a case in which "judging", "calculating", "computing", "processing", "deriving", "investigating", "looking up" (e.g., looking up a table, database, or other data structures), or "ascertaining" is deemed as "determining". Also, "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining".

The description "based on" used in the present specification does not mean "based on only" unless otherwise specifically noted. In other words, the phrase "base on" means both "based on only" and "based on at least".

When the terms "include", "including", and variations thereof are used in the present specification or in the claims, the terms are intended to be non-restrictive (to be considered "open terminology") the same as the term "comprising". Further, the term "or" used in the present specification or in the claims is intended to be not an "exclusive or".

Throughout the present specification, in the case where articles "a", "an", and "the" are added to a noun as a result of translation, unless otherwise indicated, the noun may be plural.

It should be noted that, in an embodiment of the present invention, the first RAT and the second RAT are examples of NR and E-UTRA, respectively. The first list and the second list are examples of "NR band list" and "E-UTRA band list", respectively. The terminal capability generation unit 240 is an example of a generation unit. The terminal capability management unit 140 is an example of a management unit. The "UECapabilityInformation" is an example of the terminal capability information. "requestedFreqBandList" is an example of the first information. "supportedBandCombination" is an example of the second information.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. In other words, the descriptions of the present specification are for illustrative purposes only, and are not intended to be limitations to the present invention.

The present application is based on and claims priority to Japanese patent application No. 2018-010625 filed on Jan. 25, 2018, the entire contents of which are hereby incorporated herein by reference.

DESCRIPTION OF THE REFERENCE NUMERALS

100 Base station apparatus
200 User apparatus
110 Transmission unit
120 Reception unit
130 Setting information management unit
140 Terminal capability management unit
200 User apparatus
210 Transmission unit
220 Reception unit
230 Setting information management unit
240 Terminal capability generation unit
1001 Processor
1002 Storage apparatus
1003 Auxiliary storage apparatus
1004 Communication apparatus
1005 Input apparatus
1006 Output apparatus

What is claimed is:

1. A terminal that communicates with a base station using a first Radio Access Technology (RAT) and a second RAT, the terminal comprising:
    a receiver that receives, from the base station, first information indicating bands that are listed in a first order;
    a processor that generates, based on the first order of the bands included in the first information, terminal capability information including second information that includes a combination list that includes a band combination of bands of the first RAT and bands of the second RAT; and
    a transmitter that transmits the generated terminal capability information to the base station,
    wherein the processor generates the combination list included in the second information with an order starting from a first entry in the first order of the bands included in the first information, and
    wherein the terminal communicates with the base station using one or more bands in the combination list.

2. The terminal as claimed in claim 1, wherein the processor generates a first list including bands used by the first RAT and a second list including bands used by the second RAT based on the first information, and the processor generates the second information based on the first list and the second list.

3. The terminal as claimed in claim 2, wherein the processor generates the second information by prioritizing the order of the bands of the first list.

4. The terminal as claimed in claim 2, wherein the processor generates the second information by prioritizing the order of the bands of the second list.

5. The terminal as claimed in claim 2, wherein the processor generates the second information by alternately prioritizing the bands of the first list and the bands of the second list.

6. A base station that communicates with a terminal using a first Radio Access Technology (RAT) and a second RAT, the base station comprising:
- a transmitter that transmits first information indicating bands that are listed in a first order;
- a receiver that receives terminal capability information, which is based on the first order of the bands included in the first information, including second information that includes a combination list that includes a band combination of bands of the first RAT and bands of the second RAT; and
- a processor that controls communications with the terminal based on the received terminal capability information, using an order of the combination list included in the second information of the terminal capability information,
- wherein the base station communicates with the terminal using one or more bands in the combination list.

* * * * *